US008133940B2

(12) United States Patent
Zalich et al.

(10) Patent No.: US 8,133,940 B2
(45) Date of Patent: Mar. 13, 2012

(54) METALLIC PARTICLES GENERATED IN SITU IN A POLYMER

(75) Inventors: Michael A. Zalich, Pittsburgh, PA (US); Simion Coca, Pittsburgh, PA (US); Gregory J. McCollum, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 232 days.

(21) Appl. No.: 12/533,574

(22) Filed: Jul. 31, 2009

(65) Prior Publication Data
US 2010/0004350 A1    Jan. 7, 2010

Related U.S. Application Data

(63) Continuation-in-part of application No. 11/610,651, filed on Dec. 14, 2006, now Pat. No. 7,589,141.

(51) Int. Cl.
| | |
|---|---|
| C08G 18/08 | (2006.01) |
| C08G 61/02 | (2006.01) |
| C08J 3/28 | (2006.01) |
| C08J 3/00 | (2006.01) |
| G21F 1/10 | (2006.01) |
| G21K 1/10 | (2006.01) |
| C08F 2/46 | (2006.01) |
| C08F 290/06 | (2006.01) |
| C08F 290/14 | (2006.01) |
| H05B 3/06 | (2006.01) |
| B29C 71/04 | (2006.01) |
| A61N 5/00 | (2006.01) |

(52) U.S. Cl. ............ 523/300; 523/1; 523/137; 524/430; 204/155; 204/157.71; 204/157.73; 204/157.49; 204/157.5; 204/157.75; 204/157.76; 250/492.1; 522/1; 522/81; 522/83; 522/84; 522/86

(58) Field of Classification Search .............. 523/1, 137, 523/300; 522/1, 81, 82, 83, 84, 86; 204/155, 204/157.76, 157.75, 157.71, 157.73, 157.5, 204/157.49, 157.1, 571.155, 573, 571; 250/492.1; 524/430

See application file for complete search history.

(56) References Cited

U.S. PATENT DOCUMENTS

| | | | |
|---|---|---|---|
| 3,524,754 A * | 8/1970 | Bell et al. ...................... 427/306 |
| 5,190,698 A | 3/1993 | Coltrain et al. | |
| 5,252,654 A | 10/1993 | David et al. | |
| 5,412,016 A | 5/1995 | Sharp | |
| 5,459,198 A | 10/1995 | Sharp | |
| 5,703,173 A | 12/1997 | Koloski et al. | |
| 5,726,247 A | 3/1998 | Michalczyk et al. | |
| 5,977,241 A | 11/1999 | Koloski et al. | |
| 6,232,386 B1 | 5/2001 | Vargo et al. | |
| 6,428,887 B1 | 8/2002 | Vargo et al. | |
| 6,548,590 B1 | 4/2003 | Koloski et al. | |
| 6,608,129 B1 | 8/2003 | Koloski et al. | |
| 6,790,526 B2 | 9/2004 | Vargo et al. | |
| 7,238,261 B2 | 7/2007 | Risen, Jr. et al. | |
| 2003/0148024 A1* | 8/2003 | Kodas et al. ................ 427/125 |
| 2006/0083694 A1* | 4/2006 | Kodas et al. ................ 424/46 |

OTHER PUBLICATIONS

Itakura, Tetsuyuki et al., "Preparation and Characterization of Ultrafine Metal Particles in Ethanol by UV Irradiation Using a Photoinitiator", Langmuir, 1995, pp. 4129-4137, 11 (10), American Chemical Society, Washington, D.C., United States of America.

Koloski, Timothy S. et al., "Fabrication of Metal and Metal-oxide Macromolecular Networks within Fluoropolymer Free Volumes", Integument Technologies, Incorporated, pp. 918-919, Jamestown, New York, United States of America.

Kometani, Noritsugu et al., "Preparation of colloidal silver nanoparticles using benzoin as a photoinitiator", Colloids and Surfaces A: Physicohem. Eng. Aspects, 2008, pp. 43-46, 313-314, Elsevier B.V.

Korchev, A. S. et al., "Polymer-Initiated Photogeneration of Silver Nanoparticles in SPEEK/PVA Films: Direct Metal Photopatterning", J. Am. Chem. Soc., 2004, pp. 10-11, 126 (1), American Chemical Society, Washington, D.C., United States of America.

McCarthy, D. W. et al., "Synthesis, Structure, and Properties of Hybrid Organic-Inorganic Composites Based on Polysiloxanes. I. Poly(Dimethylsiloxane) Elastomers Containing Silica", Journal of Polymer Science: Part B: Polymer Physics, 1998, pp. 1167-1189, vol. 36, John Wiley & Sons, Inc.

Rajan, Guru S. et al., "Preparation and Characterizaton of Some Unusually Transparent Poly(dimethylsiloxane) Nanocomposites", Journal of Polymer Science: Part B: Polymer Physics, 2003, pp. 1897-1901, vol. 41, Wiley Periodicals, Inc.

See, Kevin C., "Modeling Interband Transitions in Silver Nanoparticle-Fluoropolymer Composites", J. Phys. Chem. B., 2005, pp. 2693-2698, vol. 109, No. 7, American Chemical Society.

Simonetti, N. et al., "Electrochemical Ag+ for Preservative Use", Applied and Environmental Microbiology, Dec. 1992; pp. 3834-3836, vol. 58, No. 12.

Yu, J. et al. "Polymers with Palladium Nanoparticles as Active Membrane Materials", Journal of Applied Polymer Science, 2004, pp. 749-756, vol. 92, Wiley Periodicals, Inc.

Yuan, Q. Wendy et al., "Reinforcement of poly(dimethylsiloxane) networks by blended and in-situ generated silica fillers having various sizes, size distributions, and modified surfaces", Macromol. Chem. Phys., 1999, pp. 206-220, 200, Wiley-VCH Verlag GmbH, D-69451, Weinheim.

\* cited by examiner

*Primary Examiner* — Patrick Ryan
*Assistant Examiner* — Aaron Greso
(74) *Attorney, Agent, or Firm* — Donald R. Palladino; Williams J. Uhl

(57) ABSTRACT

Methods for generating metallic particles in situ in a polymer are disclosed. A method includes (a) contacting the polymer with a solution comprising (i) a solvent, (ii) a metal salt, and (iii) a free radical generator; (b) removing the polymer from the solution; and (c) exposing the polymer to actinic radiation. Polymer composites and polymer nanocomposites comprising inorganic particulates comprising metallic particles generated in the polymer are also disclosed.

9 Claims, No Drawings

US 8,133,940 B2

METALLIC PARTICLES GENERATED IN SITU IN A POLYMER

CROSS-REFERENCE TO RELATED APPLICATIONS

This is a continuation-in-part of U.S. patent application Ser. No. 11/610,651 filed Dec. 14, 2006 (recently allowed), entitled "Organic-Inorganic Polymer Composites and Their Preparation by Liquid Infusion", which bears United States Publication No. US 2008/0146716 A1 published on Jun. 19, 2008, and incorporates by reference the contents of and claims the benefit of this prior non-provisional application.

FIELD OF THE INVENTION

The present invention relates to methods for generating metallic particles in situ in a polymer, and related polymer composites.

BACKGROUND OF THE INVENTION

It is known to blend organic polymers with inorganic particulate materials in order to improve certain properties of the polymer. Typically, the organic polymer and the inorganic particulate material are milled together under high shear conditions. Often the milling process degrades the polymer resulting in some poor performance properties. A more elegant way to introduce an inorganic component into an organic polymer is to dissolve the organic polymer in an organic solvent that contains a dissolved or dispersed inorganic component. Upon agitation, the inorganic component becomes intimately mixed with the polymer phase. However, such a process is limited to thermoplastic polymers as it is not possible to disperse particles in thermoset (i.e. crosslinked) polymer systems in that once cured, a crosslinked thermoset polymer will not melt upon the application of heat and is insoluble in solvents.

Another way of introducing the inorganic component into either thermoplastic or thermoset polymers is to disperse the inorganic component into the monomers used to prepare the polymers and to polymerize the monomers. However, many inorganic species will interfere with polymerization reactions. For example, with polyurethanes prepared from polyisocyanates and polyols, the use of inorganic phases based on metal alkoxides can generate alcohols that are reactive with isocyanates and the metal may prematurely catalyze the urethane forming reaction leading to undesirable results. If this technique for introducing inorganic particles into polymers were to be used, the particles would be distributed evenly throughout the polymer phase in instances where no inorganic particle surface treatments are employed.

SUMMARY OF THE INVENTION

In certain aspects, the present invention relates to a method for generating metallic particles in situ in a polymer. This method comprises: (a) contacting the polymer with a solution comprising: (i) a solvent, (ii) a metal salt, and (iii) a free radical generator; (b) removing the polymer from the solution; and (c) exposing the polymer to actinic radiation to generate metallic particles in situ in the polymer.

In other aspects, the present invention relates to a polymer composite. This polymer composite comprises: (a) a polymer, and (b) inorganic particulates generated in situ in the polymer and comprising metallic particles.

In still other aspects, the present invention relates to a method for generating metallic particles in situ in a polymer. This method comprises: (a) contacting the polymer with a first solution comprising: (i) a solvent, and (ii) a metal salt; (b) removing the polymer from the first solution; and (c) contacting the polymer with a second solution comprising an agent selected from reducing agents and developing agents to generate metallic particles in situ in the polymer.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "thermoset polymer" means a polymer that "sets" irreversibly upon curing or crosslinking. Once cured, a crosslinked thermoset polymer will not melt upon the application of heat and is insoluble in solvents.

The term "thermoplastic polymer" means a polymer that undergoes liquid flow upon heating and is soluble in solvents.

The term "polyurethane" is intended to include not only polyurethanes that are formed from the reaction of polyisocyanates and polyols but also poly(urethane-ureas), which are prepared from the reaction of polyisocyanates with polyols and polyamines.

The term "aliphatic" is meant to include cycloaliphatic.

The term "polymer", unless specifically stated otherwise, is meant to include thermoset polymers and thermoplastic polymers, which may include copolymers and oligomers.

The terms "infusion" and "infusing" are meant to indicate the penetration of a solution into the polymer by contacting the polymer with the solution.

The terms "free radical generator" and "free radical photoinitiator" are used interchangeably and refer to a photoinitiator molecule which either (i) undergoes a unimolecular bond cleavage upon irradition to yield free radicals (Type I) or (ii) undergoes a bimolecular reaction where the excited state of the photoinitiator interacts with a second molecule (a co-initiator) to generate free radicals (Type II). It is known that visible light photoinitiators belong almost exclusively to the Type II class of photoinitiators.

The term "transparent" as used in connection with the polymer of the invention means that the polymer has the property of transmitting light without appreciable scattering so that objects lying beyond are entirely visible. For example, the letter quality pica print on white paper can be read through a 0.5 cm thick layer of the composite polymer of the invention. "Transparent" means having a transmittance through the article of greater than 0% up to 100%.

The term "colorless" means the absence of color visible to the naked eye appearing in the polymer.

The terms "tint", "tinted", "color" and "colored" mean a coloring effect visible to the naked eye appearing in the polymer as a result of particle formation.

The term "antimicrobial" as used in connection with the polymer composite of the invention refers to a polymer composite that kills or inhibits the growth of microbes such as bacteria, fungi, protozoa or viruses.

The term "nanocomposite" refers to a polymer composite including nanoparticles.

An aspect of the present invention relates to a method for generating inorganic particles, i.e. metallic particles in situ in a polymer, comprising: (a) contacting the polymer with a solution comprising (i) a solvent, (ii) a metal salt, and (iii) a free radical generator; (b) removing the polymer from the solution; and (c) exposing the polymer to actinic radiation to generate metallic particles in situ in the polymer. In certain embodiments, step (a) comprises infusing the polymer with the solution.

In non-limiting embodiments of the invention, the polymer may be a thermoset polymer. The thermoset polymer can be selected from a variety of thermosetting polymers such as thermosetting polyurethanes, thermosetting polyesters, thermosetting resins derived from polyepoxides, phenolic resins, urea-formaldehyde resins, melamine-formaldehyde resins, polyimides such as bismaleimides and high temperature polyimides such as PMR and DMBZ polyimides. However, thermosetting polyurethanes may be preferred.

The thermosetting polyurethane can be prepared by reacting polyisocyanate with a polyol component and optionally with a polyamine in which one or all of the components have functionality greater than 2. For example, a diisocyanate can be reacted with a polyol compound having an average functionality greater than 2, for example, a triol or higher functionality polyol, or a mixture of a triol or higher functionality polyol and a diol. Also, the polyisocyanate can have functionality greater than 2 such as a triisocyanate and can be reacted with a polyol and optionally a polyamine having a functionality of 2 or more.

The thermosetting polyurethane can be prepared by the "one-shot" or by the "prepolymer" method. In the one-shot method, all of the reactants are charged to a reaction vessel and reacted together. In the prepolymer method, an excess of polyisocyanate is reacted with a portion of the polyol component to form an isocyanate prepolymer. The prepolymer is then reacted with the remaining polyol to form the thermosetting polyurethane.

The following exemplary monomers can be used to prepare the thermoset polyurethane: aliphatic including cycloaliphatic bifunctional isocyanates such as 1,6-hexamethylene diisocyanate and 2,2,4- and 2,4,4-trimethyl-1,6-hexane diisocyanate, bis(4-isocyanatocyclohexyl)methane, bis(3-methyl-4-isocyanatocyclohexyl)methane, 2,2-bis(4-isocyanatocyclohexyl)propane and 3-isocyanato-3,5,5-trimethylcyclohexyl isocyanate and isophorone diisocyanate or their tri or higher functionality biurets and isocyanurates, such as the isocyanurate of 1,6-hexmethylene diisocyanate and the isocyanurate of isophorone diisocyanate. Aromatic polyisocyanates such as 2,4-toluene diisocyanate or meta-phenylene diisocyanate may also be used. However, aliphatic polyisocyanates are preferred when the composite of the invention is to be exposed to visible or ultraviolet radiation.

The polyols that are to be used can be diols having from 2 to 12 carbon atoms. Aliphatic diols are preferred. Examples include ethylene glycol, 1,4-butanediol, 1,6-hexanediol and 2-methyl-2-n-propyl-1,3-propanediol.

Higher functionality polyols having a functionality of 3 or more, for example, from 3 to 10, can also be used. Examples of such polyols are branched aliphatic polyols having from 4 to 12 carbon atoms. Examples include trimethylolpropane, trimethylolheptane, trimethylolethane, pentaerythritol and sorbitol. Mixtures of diols and higher functionality polyols can be used. Typically, the equivalent ratio of diol to higher functionality polyol will be about 0.1 to 20:1, preferably 0.1 to 9:1, such as 1 to 5:1.

Optionally, a polyamine having a functionality of 2 or more, typically from 2 to 4, can be used with the polyol component. Examples of suitable polyamines are aliphatic polyamines having from 2 to 12 carbon atoms such as ethylenediamine and diethylenetriamine. Aromatic polyamines having from 6 to 20 carbon atoms such as various isomers of phenylenediamine and p,p-methylenedianiline can be used; however, aliphatic polyamines are preferred. The polyamines, if used, are present in amounts up to 9, preferably no more than 1 equivalent per equivalent of polyol. Other optional reactants are polymeric polyols such as polyether polyols and polyester polyols having a number average molecular weight ranging from 400 to 4000 g·mol$^{-1}$; the molecular weight being determined by gel permeation chromatography using a polystyrene standard. If used, the polymeric polyol is present in amounts of about 1 to 60, such as 10 to 60, preferably 10 to 25 percent by weight based on total polyol weight. The composition can optionally contain a catalyst such as dibutyltin dilaurate, typically present in amounts of 0.1 to 2.0 percent by weight based on weight of polyurethane reactants.

The thermoset polyurethane is typically prepared by mixing the reactants and heating in a reaction vessel under vacuum to remove any entrapped gases. The reaction mixture can then be cast between two sealed and spaced apart glass plates that have been treated with a release agent. The assembly containing the polyurethane reaction mixture is then heated at a temperature of from 90 to 170° C. for about 30 minutes to 24 hours to cure the polyurethane. The assembly is then cooled and the thermoset polyurethane removed from the assembly.

The inorganic particulates, i.e. metallic particles associated with the polymer composites of the invention may comprise virtually any metal, such as transition metals and may include gold, mercury, tin, lead, bismuth, cadmium, chromium and thallium, and all the metals disclosed in the aforesaid parent case bearing U.S. patent application filed Dec. 14, 2006, among many other metals. In certain embodiments wherein antimicrobial properties are sought, the polymer composites of the invention may comprise a metal selected from silver, copper, zinc, and mixtures thereof.

The metallic particles may be incorporated into the polymer by using a precursor such as metal salts containing the metal. The metal salts are dissolved in the solvent used to swell the thermoset polymer. The free radical generator or photoinitiator is then added to the solution containing the dissolved metal salts and solvent. Suitable metal salts include, for example, nitrates, sulfides, phosphates, sulfates, fluorides, chlorides, bromides, iodides, and mixtures thereof. Specific examples of suitable nitrates include but are not limited to, silver nitrates, ferric nitrates, nickel nitrates, zinc nitrates, and copper nitrates, among many others. Specific examples of suitable sulfates include, but are not limited to silver sulfates, copper sulfates, and zinc sulfates among many others. Specific examples of suitable sulfides include, but are not limited to silver sulfides and zinc sulfides, among many others. Specific examples of suitable chlorides include but are not limited to, silver chlorides, iron chlorides, and zinc chlorides among many others. Specific examples of suitable phosphates include but are not limited to, silver phosphates, iron phosphates and zinc phosphates, among many others. Specific examples of suitable fluorides include but are not limited to, zinc fluorides and silver fluorides, among many others. Specific examples of suitable bromides include but are not limited to, zinc bromides, ferric bromides, copper bromides and silver bromides, among many others. Specific examples of suitable iodides include but are not limit to, silver iodides, among many others.

In certain embodiments of the methods of the present invention, the thermoset polymer is contacted with the solution so as to infuse the solution into the thermoset polymer. Contacting the thermoset polymer with the solution may be achieved by immersion of the polymer in the solution. The polymeric material may be quickly dipped or soaked for longer periods of time depending upon the time needed to allow swelling and infusion of the precursor into the polymer. The time required can vary depending on identity of the thermoset polymer chosen, the solvent and the temperature. Often, the solutions are maintained at a temperature between room temperature and the boiling point of the solvents, i.e. within the temperature range of 0-100° C., and the immersion time will be from 1 minute to several hours, and in some instances, one day to several days, depending on the desired depth for the infusion of the precursor, i.e. metal salt into the polymer. Pressure is not critical, although higher pressure may be advantageous to promote infusion. In certain embodiments, the process is carried out at atmospheric pressure and temperature.

In a non-limiting embodiment, the contacting of the thermoset polymer with the solution generally will involve immersing or soaking the polymer in the solution for a predetermined time, such as for 24 hours, thereby infusing the solution in the polymer. The thermoset polymer, still infused with the solution comprising the solvent, the metal salt and free radical generator, is removed from the solution and exposed to actinic radiation whereby the metallic particles are generated in situ in the polymer.

The solvents in the foregoing solution, including those that are used in the present invention are those that are capable of swelling the thermoset polymer and dissolving the metal salts. As used herein, "swelling" means that the thermoset polymer experiences an increase in weight, such as a 1 to 15 percent, or, in some cases, 5 to 15 percent, increase in weight when contacted with or immersed in the solution containing the solvent for 24 hours at ambient temperature and pressure. Examples of suitable solvents include but are not limited to, alcohols, such as those containing from 1 to 4 carbon atoms such as methanol and ethanol, ethyl acetate, methylethyl ketone and N-methylpyrrolidone, and mixtures thereof. The concentration of the metal salt in the swelling solvent is, in certain embodiments, 2 percent by weight to saturation based on the total weight of the solution. Other materials may be present in the treating solution. Such materials are often soluble in the solvent and compatible with the polymer and the precursor, i.e. metal salt. Examples of such materials would include, for example, anti-static compounds and dyes.

As noted above, the solution with which the polymer is contacted in a method of the present invention may include a free radical generator or photoinitiator. Conventional free radical photoinitiators can be used, including but not limited to benzophenones, acetophenone derivatives, such as alpha-hydroxyalkyl-phenylketones, benzoins such as benzoin alkyl ethers and benzyl ketals, phosphine oxides, monoacylphosphine oxides, and bisacylphosphine oxides Free radical photoinitiators are commercially available from, for example, Ciba Specialty Chemicals Corporation in their DAROCUR and IRGACURE lines; IRGACURE 184, IRGACURE 651, IRGACURE 1800, DAROCUR 1173 AND DAROCUR 4265 being particularly suitable.

In certain embodiments, the free radical photoinitiators of Type I described above are used in the invention. Any suitable free radical photoinitiator of Type I can be used including, for example, benzoin ethers, benzyl ketals, alpha-dialkoxy-acetophenones, alpha-hydroxy-alkyl-phenones, alpha-amino alkyl-phenones, and acyl-phosphine oxides, some of which are listed in the preceding paragraph. In certain non-limiting embodiments, free radical photoinitiators are alpha hydroxy ketones such as DAROCUR 1173 available from Ciba Specialty Chemicals Corporation.

In certain embodiments, a Type II (described herein above) free radical photoinitiator is used. Suitable Type II free radical photoinitiators may include, for example, benzophenones/amines and thio-xanthones/amines.

In certain embodiments, the amount of free radical generator or photoinitiator in the solution of the invention may range from 0.1 to 5.0 weight percent, such as 0.4 and 1.9 weight percent, based on the total weight of the solution.

In certain embodiments, it is believed that the process may be a photoreduction process which process reduces metal ions and/or cations to subsequently form colloidal metal nanoparticles when near-actinic radiation is irradiated onto the polymer which has been contacted or infused with a solution comprising mixture of solvent, metal salt, and a free radical generator. For generation of the metallic particles in the polymer, the polymer, after contact or infusion with the solution, is exposed to actinic radiation as stated herein above.

The polymer treated as described herein above is removed from the radiation source and the excess solvent is removed by evaporation through air drying at ambient temperature or by heating at elevated temperature, for example at 60° C. or above, for example, 100° C., but below the decomposition temperature of the polymer. The time for heating is typically from 15 minutes to 5 hours depending on the temperature and vapor pressure of the solvent. Optionally, heating can be under vacuum.

As stated herein above, the depth of generation of the metallic particles in the polymer is dependent on the identity of the polymer, the swelling solvent and the conditions of infusion for example the length of time the polymer is contacted with or immersed in the solution. In certain non-limiting embodiments, the metallic particles are generated in the surface regions of the polymer, that is, in the area within 100 micrometers from the surface of the polymer. In some embodiments, at least 50 percent, more typically at least 75 percent, and most often, at least 90 percent of the metallic particles will be generated in the first 100 micrometers from the surface of the polymer. The depth of infusion of the solvent and therefore generation of the metallic particles can be determined by scanning or transmission electron microscopy.

The size of the metallic particles generated in the polymer depends to some extent on the conditions of infusion of the solvent and the thermoset polymer and may comprise nanoparticles having an average primary particle size less than 1000 nanometers. In certain non-limiting embodiments, the size of the metallic particles generated in the polymer will have an average primary particle size of no more than 100 nanometers. In certain non-limiting embodiments, the average primary particle size of the metallic particles generated in the polymer will range between 1 to 50 nanometers. In certain non-limiting embodiments, the average primary particle size of the metallic particles generated in the polymer will range between 1 to 30 nanometers. In certain non-limiting embodiments the average primary particle size of the metallic particles generated in the polymer will range between 1 to 10 nanometers. The average primary particle size of the metallic particles can be determined by small angle X-ray scattering and transmission electron microscopy (TEM) techniques.

In certain embodiments, the weight percent of the metallic particles generated in the thermoset polymer may range from 0.01 to 20 percent by weight based on total weight of the polymer containing the infused dispersed particles. In some embodiments, this weight percent of the metallic particles generated in the thermoset polymer may be greater than 20 percent by weight depending on the free volume in the polymer. The weight percent of the metallic particles can be determined by heating the composite to the point of decomposition of the polymer and the inorganic residue determined gravimetrically.

The polymer composites of the invention are useful in applications where thermoset polymers are used, for example, engineering resins, except they will have modified properties due to the metallic particles. Scratch and mar resistance may be significantly improved. When the infused and thus, generated metallic particles are of nano dimensions, typically less than 700 and preferably less than 100 nanometers, the polymer composites may be useful in optical applications such as lenses, goggles, display devices and transparencies for motor vehicles and aircraft. Such polymer composites are generally referred to as polymer nanocomposites.

The polymer composites of the invention may be useful in antimicrobial applications, for example, consumer electronics devices including cellular phones, personal digital assistants, smart phones, personal computers, digital cameras, and other consumer electronics. Such polymer composites may generally be referred to as antimicrobial polymer composites, wherein the polymer composites have antimicrobial properties.

The polymer composites of the invention may also be useful in applications requiring plastics with improved properties, such as abrasion resistance and/or different optical behaviors.

Actinic radiation useful in the present invention is light with wavelengths of electromagnetic radiation ranging from gamma rays to the ultraviolet (UV) light range, through the visible light range and into the infrared range. Actinic radiation which can be used in the method of the present invention generally has wavelengths of electromagnetic radiation ranging from 100 to 2,000 nanometers (nm), such as from 180 to 1,000 nm, or in some cases, from 200 to 500 nm. Examples of suitable ultraviolet light sources are normally found in radiation emitted from the sun or from artificial sources such as Type RS Sunlamps, carbon arc lamps, xenon arc lamps, mercury vapor lamps, tungsten halide lamps, swirl-flow plasma arcs, ultraviolet light emitting diodes and ultraviolet light emitting lasers. Ultraviolet radiation will often be effective since the solution with which the polymer comes into contact comprises a free radical photoinitiator. Exposure periods of from 1 second to 15 minutes may be typical. In some non-limiting embodiments exposure periods of about 30 seconds are effective. In other non-limiting embodiments exposure periods of about 60 seconds are effective. In some non-limiting embodiments, exposure of one or all sides of the polymer may be effective for generating the metallic particles in the polymer. These exposure periods may range from about 30 seconds to 60 seconds for all sides of the polymer.

In certain embodiments, the invention may relate to a photoreduction process which includes the use of a free radical photoinitiator for generating metallic particles, which may generally be metallic nanoparticles. After the polymer of the present invention is contacted or infused with the solution containing the solvent, the metal salt or metal cations, and the free radical generator or photoinitiator, the polymer is removed from the solution. Generally, the polymer is transparent and colorless, and has a weight increase due to solvent swelling. The polymer is then exposed to actinic radiation to generate the metallic particles in situ in the polymer and the polymer may turn from being transparent and colorless to being transparent and having a slight yellowish tint or a slight yellow/brown tint.

In some non-limiting embodiments of the invention, the solution is formed by dissolving the metal salt in the solvent and then adding the free radical generator or photoinitiator to the resultant solution.

A further aspect of the present invention comprises the use of agents for generating metallic particles in situ in a polymer via a chemical reduction process or via a photographic process. Examples of suitable reducing agents via a chemical reduction process include hydrazine, tetrabutylammonium borohydride, potassium borohydride, sodium borohydride, lithium aluminum hydride and the like for reducing metal salts to form metal nanoparticles. In a photographic process, developing agents are generally used to reduce silver ions to silver metal. Examples of suitable developing agents for use in the invention include hydroquinone and derivatives thereof, catechol, p-aminophenol and derivatives thereof, phenylenediamine and derivatives thereof. Examples of other metals which can be reduced include $Fe^{+2}$, $Ti^{+3}$ and $V^{+2}$. In certain embodiments, a method for generating metallic particles in situ in a polymer comprises (a) contacting the polymer with a first solution comprising: (i) a solvent and (ii) a metal salt; (b) removing the polymer from the first solution; and (c) contacting the polymer with a second solution comprising an agent selected from reducing agents and developing agents to generate metallic particles in situ in the polymer. In certain embodiments, step (a) comprises infusing the polymer with the first solution.

The following examples are presented to demonstrate the general principles of an aspect of the invention. However, the invention should not be considered as limited to the specific examples presented. All parts are by weight unless otherwise indicated.

Example A

With reference to the Table below, thermoset polyurethane was prepared as follows:

A reaction vessel was equipped with a stirrer, thermocouple, nitrogen inlet, distillation container and vacuum pump. Charge A was then added and stirred with heating to 80° C.-100° C. under vacuum and held for 1 hour. The reaction mixture was then cooled to 80° C., the vacuum was turned off and Charge B was added to the vessel. The reaction mixture was then heated to 80° C. under vacuum and allowed to exotherm from 110° C. to 120° C. The reaction mixture was then cast in place between two float glass plates, which measured 5 inch×5 inch×3/16 inch and which were fitted with gaskets on three sides and held together by clamps. Both glass plates had a silane release coating on their faces that contacted the polyurethane. The spacing between the plates was approximately 3/16 inch. The casting cell was preheated to a temperature of 120° C. before casting. After casting, the cell assembly was given a 24 hour cure at 120° C. and then a 16 hour cure at 143° C. After curing was complete, the cell assembly was given a two hour gradual cool down cycle from a temperature of 143° C. to 45° C. while remaining in the oven. The cell assembly was removed from the oven and the glass plates were separated from the polyurethane.

TABLE

|  | Parts by Weight |
| --- | --- |
| Charge A |  |
| 1,10-Decanediol | 61.00 |
| Trimethylolpropane | 13.41 |
| Charge B |  |
| Desmodur W[1] | 131.00 |

[1]Bis(4-isocyanatocyclohexyl)methane from Bayer Material Science.

The following Examples illustrate the infusion and thereafter the generation of various metallic particles in thermoset polyurethane according to a method of the invention. The thermoset polyurethane of Example A was contacted with a solution comprising methanol (swelling solvent), a metal salt and alpha hydroxy ketone (free radical photoinitiator). The alpha hydroxy ketone used in Examples 1-3 is commercially available under the trade name DAROCUR 1173 available from Ciba Specialty Chemicals Corporation, Basel, Switzerland. The polyurethane samples of Example A were cooled to room temperature and used in Examples 1-3 in solid form.

Example 1

Infusion of silver nitrate into thermoset polyurethane and generation of silver in situ therein:

0.8 grams of $AgNO_3$ were dissolved in 45.7 grams of methanol. 0.21 grams of alpha hydroxy ketone were added to the silver nitrate/methanol solution (1.7% silver nitrate, 0.45% alpha hydroxy ketone). A piece of polyurethane plastic (¼" thick) of Example A was soaked in the resulting methanol solution for 24 hours and removed. After soaking, the plastic was transparent and colorless and the weight increased by 11%. The plastic was exposed to UV light for 30 seconds per side. A lamp was used for this purpose. The lamp contained an iron doped mercury vapor bulb with a glass filter which filtered out the UV-C and UV-B radiation. Therefore, the only radiation that made it to the plastic was UV-A, visible and infrared.

After exposure to UV light, the plastic was transparent and visually had a yellow tint. The plastic was placed under vacuum for 6 hours to remove excess methanol. The plastic was cut into thin sections by a microtome which is an instrument used to acquire sections for microscopy. The resulting microtomed sections were analyzed by transmission electron microscopy (TEM). TEM indicated that silver nanoparticles having an average primary particle size ranging between 1 and 50 nanometers in diameter were generated in the polyurethane plastic.

Example 2

Infusion of zinc nitrate into thermoset polyurethane and generation of zinc in situ therein:

1.106 grams of $Zn(NO_3)_2$ were dissolved in 10.91 grams methanol. 0.23 grams of alpha hydroxy ketone were added to the zinc nitrate/methanol solution (9% zinc nitrate, 1.9% alpha hydroxy ketone). A piece of polyurethane plastic (¼" thick) was soaked in the resulting solution for 24 hours and removed. After soaking, the plastic was transparent and colorless. The plastic was exposed to UV light for 60 seconds per side. A lamp was used for this purpose. The lamp contained an iron doped mercury vapor bulb with a glass filter which filtered out the UV-C and UV-B radiation. Therefore, the only radiation that made it to the plastic was UV-A, visible and infrared.

After exposure to UV light, the plastic was transparent and visually had a slight yellow/brown tint. The plastic was placed into an oven at 100° C. for one hour to remove excess methanol. The plastic was cut into thin sections by a microtome which is an instrument used to acquire sections for microscopy. The resulting microtomed sections were analyzed by transmission electron microscopy (TEM). TEM indicated that zinc nanoparticles having an average primary particle size ranging between 1 and 30 nanometers in diameter were generated in the polyurethane plastic.

Example 3

Infusion of copper nitrate in thermoset polyurethane and generation of copper in situ therein:

1.779 grams $Cu(NO_3)_2$ was dissolved in 11.6 grams methanol. 0.23 grams of alpha hydroxy ketone was added to the copper nitrate/methanol solution (13.1% copper nitrate, 1.7% alpha hydroxy ketone). A piece of polyurethane plastic (¼" thick) was soaked in the resulting methanol solution for 24 hours and removed. After soaking, the plastic was transparent and colorless. The plastic was exposed to UV light for 60 seconds per side. A lamp was used for this purpose. The lamp contained an iron doped mercury vapor bulb with a glass filter which filtered out the UV-C and UV-B radiation. Therefore, the only radiation that made it to the plastic was UV-A, visible and infrared.

After exposure to UV light, the plastic was transparent and visually had a slight yellow/brown color. The plastic was placed into an oven at 100° C. for one hour to remove excess methanol. The plastic was cut into thin sections by a microtome, which is an instrument used to acquire sections for microscopy. The resulting microtomed sections were analyzed by transmission electron microscopy (TEM). TEM indicated that copper nanoparticles having an average primary particle size ranging from 1 and 10 nanometers in diameter were generated in the polyurethane plastic.

Although embodiments herein have been exemplified using a thermoset plastic, such as a thermoset polyurethane, a thermoplastic polymer may be used in the invention. Suitable thermoplastic polymers include poly(carbonate), poly(methyl methacrylate), poly(styrene), poly(butadiene), poly(amide), poly(ester), poly(imide), poly(vinyl acetate), poly(tetrafluoroethylene), poly(ethylene terephthalate), poly(ethylene), poly(propylene) and the like.

Also, even though embodiments herein have been exemplified using metal salts infused in the polymer and metallic particles such as silver, zinc, and copper, generated therein, as stated herein above, other metals may be infused and thereafter generated in situ in the polymer according to the present invention. Additionally, other inorganic particulates may be infused and thereafter generated in situ in the polymer according to the present invention.

Whereas particular embodiments of this invention have been described above for purposes of illustration, it will be evident to those skilled in the art that numerous variations of the details of the present invention may be made without departing from the invention as defined in the appended claims.

We claim:

1. A method for generating metallic particles in situ in a solid polymer, comprising:
    (a) contacting the polymer with a solution comprising:
        (i) a solvent,
        (ii) a metal salt, and
        (iii) a free radical generator;
    (b) infusing the solution into the solid polymer surface;
    (c) removing the polymer from the solution that has not been infused into the polymer surface; and
    (d) exposing the polymer to actinic radiation to generate metallic particles in situ in the surface regions of the polymer.

2. The method of claim 1, wherein the metal salt is selected from nitrates, sulfides, phosphates, sulfates, fluorides, chlorides, bromides, iodides, and mixtures thereof.

3. The method of claim 1, wherein the metal salt comprises a metal selected from silver, copper, zinc, and mixtures thereof.

4. The method of claim 1, wherein the solvent comprises an alcohol.

5. The method of claim 1, wherein contacting the polymer comprises immersing the polymer in the solution.

6. The method of claim 1, wherein the free radical generator comprises a free radical photoinitiator.

7. The method of claim 1, wherein the metallic particles comprise nanoparticles having an average primary particle size less than 1000 nanometers.

8. The method of claim 7 wherein the metallic nanoparticles have an average primary particle size of no more than 100 nanometers.

9. The method of claim 1 in which the solution is infused in an area within 100 micrometers from the surface of the polymer.

* * * * *